United States Patent
Andersson et al.

(10) Patent No.: US 7,152,306 B2
(45) Date of Patent: Dec. 26, 2006

(54) METHOD FOR INSTALLING A STATOR WINDING

(75) Inventors: Birger Andersson, Västerås (SE); Lars Öhrn, Enköping (SE); John Seppas, Västerås (SE); Hans-Åke Eriksson, Västerås (SE); Gunnar Porsby, Västerås (SE); Göran Eriksson, Stockholm (SE); Jan-Olof Lamell, Västerås (SE); Ville Voutilainen, Vantaa (FI); Daniel Dahlblom, Västerås (SE); Lars Bjernegård, Västerås (SE)

(73) Assignee: ABB AB, Västerås (SE)

( * ) Notice: Subject to any disclaimer, the term of this patent is extended or adjusted under 35 U.S.C. 154(b) by 310 days.

(21) Appl. No.: 10/467,160

(22) PCT Filed: Feb. 8, 2002

(86) PCT No.: PCT/SE02/00205

§ 371 (c)(1),
(2), (4) Date: Dec. 23, 2003

(87) PCT Pub. No.: WO02/065623

PCT Pub. Date: Aug. 22, 2002

(65) Prior Publication Data

US 2004/0084993 A1 May 6, 2004

(30) Foreign Application Priority Data

Feb. 9, 2001 (SE) .................................. 0100429

(51) Int. Cl.
*H02K 3/04* (2006.01)
*H02K 3/12* (2006.01)
*H02K 15/085* (2006.01)

(52) U.S. Cl. ........................... 29/605; 29/596; 29/598; 242/432

(58) Field of Classification Search .................. 29/596, 29/605, 598; 242/430, 434, 432, 432.1; 174/DIG. 13–DIG. 33; 310/254, 214, 215, 260
See application file for complete search history.

(56) References Cited

U.S. PATENT DOCUMENTS 2,180,983 A * 11/1939 Hall ........................... 310/215

(Continued)

FOREIGN PATENT DOCUMENTS

WO 97/45919 12/1997

(Continued)

OTHER PUBLICATIONS

X20030418, Fiber Optic Cable, Apr. 18, 2003□□ Internet: http://web.archive.org/web/20030418094255/www.lanshack.com/fiber-optic-tutorial-cable.asp.*

*Primary Examiner*—Peter Vo
*Assistant Examiner*—Livius Radu Cazan
(74) *Attorney, Agent, or Firm*—Venable LLP; Eric J. Franklin (57) ABSTRACT

A method for installing a stator winding in a stator core. A winding turn is formed by drawing a cable portion from a cable reel and inserting it into two winding slots. Each winding turn that is jointlessly connected to first winding turn and has the same winding direction as the first turn is formed by making this winding turn include a cable section corresponding to a turn on the reel that has been lifted off the reel by lateral movement over a gable of the reel. To form each winding turn that is jointlessly connected to the first winding turn and has a second winding direction opposite the winding direction of the first turn, the cable portion forming this winding turn is made to include a section corresponding to a turn on the reel that has been lifted off the reel by lateral movement over the other gable.

16 Claims, 5 Drawing Sheets

U.S. PATENT DOCUMENTS

| | | | |
|---|---|---|---|
| 2,551,135 A * | 5/1951 | Justice | 242/432 |
| 2,647,696 A * | 8/1953 | Brunand | 242/432.3 |
| 2,701,317 A * | 2/1955 | Clairmont | 310/215 |
| 3,044,150 A * | 7/1962 | Higley | 29/596 |
| 3,995,785 A * | 12/1976 | Arick et al. | 242/432.4 |
| 5,173,139 A * | 12/1992 | Rippingale et al. | 156/185 |
| 6,279,850 B1 * | 8/2001 | Berggren | 242/432 |
| 6,439,497 B1 * | 8/2002 | Backlund et al. | 242/430 |
| 6,972,505 B1 * | 12/2005 | Leijon et al. | 310/196 |
| 2002/0047438 A1 | 4/2002 | Leijon | 310/179 |
| 2002/0063487 A1 | 5/2002 | Leijon | 310/179 |

FOREIGN PATENT DOCUMENTS

| | | |
|---|---|---|
| WO | 97/45921 | 12/1997 |
| WO | WO 9745935 A1 * | 12/1997 |
| WO | 98/20602 | 5/1998 |
| WO | 98/34331 | 8/1998 |

* cited by examiner

METHOD FOR INSTALLING A STATOR WINDING

FIELD OF THE INVENTION AND PRIOR ART

The present invention relates to a method for installing a stator winding in a stator core having winding slots intended for receiving the stator winding, which winding slots extend axially through the stator core, the stator winding being formed of at least one cable, which is flexible and comprises at least one electric conductor with an envelope capable to confine the electric field generated around the conductor, which cable is provided wound on a cable reel.

Rotating electric machines with a stator winding formed of a cable of the above indicated type are for instance described in WO 97/45919 and WO 97/45921. The cable forming the stator winding is suitably a high-voltage cable core of essentially the same type as the one used as high-voltage cable core in a high-voltage cable for power distribution, i.e. a PEX-insulated cable (PEX=cross-linked polyethylene). In contrast to a power distribution cable, the cable forming the stator winding is however not provided with any metallic shield. Machines of the type in question can be constructed for very high voltages and powers and have inter alia the advantage that they can be directly connected to a high-voltage network without any intermediate transformer.

When the stator winding is to be installed in a stator of the type here intended, the winding cable is normally drawn axially through winding slots extending axially through the stator core. The cables intended for the formation of the stator winding are provided wound on cable reels. In order to form, from one and the same cable, a longer jointless winding section extending in several winding turns through the stator core, a very long cable portion has to be drawn out from the cable reel and threaded through a winding slot, whereupon the whole remaining part of the cable portion, except for the part that forms part of the coil end of the stator winding and runs out from the end of the stator core in an arc, has to be threaded through the next winding slot, and so on. With this method of installation, it is in practice not possible at a reasonable working effort to achieve a completely jointless stator winding when a stator winding is to be installed in a larger stator core with a diameter in the order of one meter or more, for instance intended to be included in a high-voltage motor or a high-voltage generator, on the contrary it is necessary to divide the stator winding into several separate cable sections connected to each other by way of cable joints. Each cable joint has to be executed with a very high accuracy so as to not have a detrimental effect on the functioning of the stator and is time-consuming to effectuate. Each cable joint also implies an increased risk of breakdowns during the operation of the stator. Consequently, it is desirable to limit the number of cable joints as far as practically possible. With this method of installation, there is also a risk of damages being caused to the cable when it is threaded through the winding slots. It is very important for the functioning of the stator that the outer layer of the cable is not damaged during the installation of the stator winding, since this outer layer is essential for the confinement of the electric field within the winding cable. Consequently, there exists a need of a more effective and secure method for installation of the stator winding in the stator type here in question.

OBJECT OF THE INVENTION

An object of the present invention is to achieve a method that makes an installation of a stator winding possible with no or only few cable joints, and which furthermore reduces the risk of the winding cable being subjected to damages during the installation work.

SUMMARY OF THE INVENTION

The inventional solution implies that it will be possible with reasonable working efforts to, if so desired, install a complete stator winding without any cable joints even in very large stator cores. Since the winding cable, with the inventional method, does not have to be threaded, i.e. axially drawn or pushed, through the winding slots, the risk of cable damages are furthermore considerably reduced as compared to the previously used method of installation. By lifting off a turn of a cable from the cable reel over one or the other of the gables of the cable reel, depending on the winding direction of the winding turn that is in turn to be installed in the intended winding slots, twistings of the cable resulting in kink are avoided. This way of lifting off a cable turn from the cable reel can be compared to the "lifting over" of the cable turn from the cable reel to the stator core. Without proceeding in this particular manner, the cable would very rapidly be twisted so much that it would be unwieldy and impossible to wind in the desired winding pattern.

According to a preferred embodiment of the invention, each winding phase is formed jointlessly of a cable provided wound on a cable reel, the first winding phase being formed of a cable provided wound on a first cable reel, the second winding phase being formed of a cable provided wound on a second cable reel and the third winding phase being formed of a cable provided wound on a third cable reel. By changing between the different cable reels during the installation of the stator winding, a jointless three-phase winding can be built up. For instance, one could start by first installing all the winding turns in the first stator pole for the first winding phase with a cable from the first cable reel, thereafter installing all the winding turns in the first stator pole for the second winding phase with a cable from the second cable reel and thereafter installing all winding turns in the first stator pole for the third winding phase with a cable from the third cable reel. At the transition to the next stator pole and winding of the first phase, with opposite current direction and thereby opposite winding direction, the cable is taken from the first cable reel, and so on. The winding is carried on in this manner with repeated changes of cable reels until the installation of the complete stator winding is finished.

According to a further preferred embodiment of the invention, the stator winding is formed of cables having different thickness. The need of cable insulation is different in different winding turns, and by using cables having different thickness, with thicker cables arranged in winding turns where the need of cable insulation is the largest and thinner cables arranged in cable turns where the need of cable insulation is the smallest, one and the same winding slot can be made to accommodate a larger number of cable sections as compared to the case when a cable of one and the same thickness is used. When using a cable of one and the same thickness, all cable sections in a winding slot would namely be dimensioned to cope with the higher requirement of cable insulation. Preferably, each part of the stator winding belonging to one and the same winding phase and consisting of a cable with one and the same thickness is formed by winding turns that are jointlessly connected to each other. Hereby, cable joints only have to be arranged at the transition between cables of different thickness.

In this description and the subsequent claims, the expression cable section refers to a longitudinal section of the winding cable.

According to a further preferred embodiment of the invention, the stator winding is installed, as seen in a cross-section through the stator core, in two or several radially successive ring-shaped areas, where the respective area has a radial extension along the winding slots and covers a complete turn around the stator core, the different areas being successively filled with cable sections in such a way that a radially outer section is filled the whole turn around with all the cable sections intended to be included in this area before an area located radially inside the outer area is filled with cable sections. In this way, it will be easy to get a good structure on the construction of the stator winding. The transition from one area to the next area will for instance offer suitable and natural places for any possibly required cable joints, for instance between cables of different thickness.

According to a further preferred embodiment of the invention, a band-shaped element, preferably of the same material as the outer layer of the cable, is placed between the cable and the walls of the respective winding slot at the areas of the axial ends of the winding slot where the cable exits the winding slot. Hereby, the outer layer of the cable is protected in the sensitive area where the cable exits the winding slot. Without such a protective element, there is a risk of wear between the cable and the stator core, which could result in serious damages on the outer layer of the cable. By letting the protective element consist of the same material as the outer layer of the cable, it is furthermore secured that the protective element does not subject the sensitive outer layer of the cable to any unsuitable substances, which for instance could effect the electric and magnetic properties of the outer layer, at a later wear between the protective element and said outer layer.

According to a further preferred embodiment of the invention, a cable section is put in place in the intended winding slot with the aid of a rod-shaped element having essentially the same external diameter as the next cable section that is intended subsequently to be placed immediately outside said cable section, which rod-shaped element is placed against the cable section along the cable section after the cable section has been inserted into the winding slot, whereupon said element is acted upon by impacts so that the element is made to occupy the place in the winding slot intended for the next cable section, whereby the element is made to press the cable section down into its intended place in the winding slot. In this way, it will be possible to force a cable section to occupy the intended position in the winding slot without subjecting the sensitive cable for any direct action by a striking tool. Owing to that the rod-shaped element has essentially the same external diameter as the next cable section that is intended to be placed immediately outside the cable section in question, it is furthermore secured that the cable section, when being installed with the aid of said element, will occupy exactly the correct position, since the element completely will occupy the place intended for the next cable section.

Further preferred embodiments of the inventional method will appear from the dependent claims and the subsequent description.

BRIEF DESCRIPTION OF THE DRAWING

The invention will be more closely described in the following by means of embodiment examples, with reference to the appended drawing. It is shown in.

DETAILED DESCRIPTION OF PREFERRED EMBODIMENTS

Figure 1:
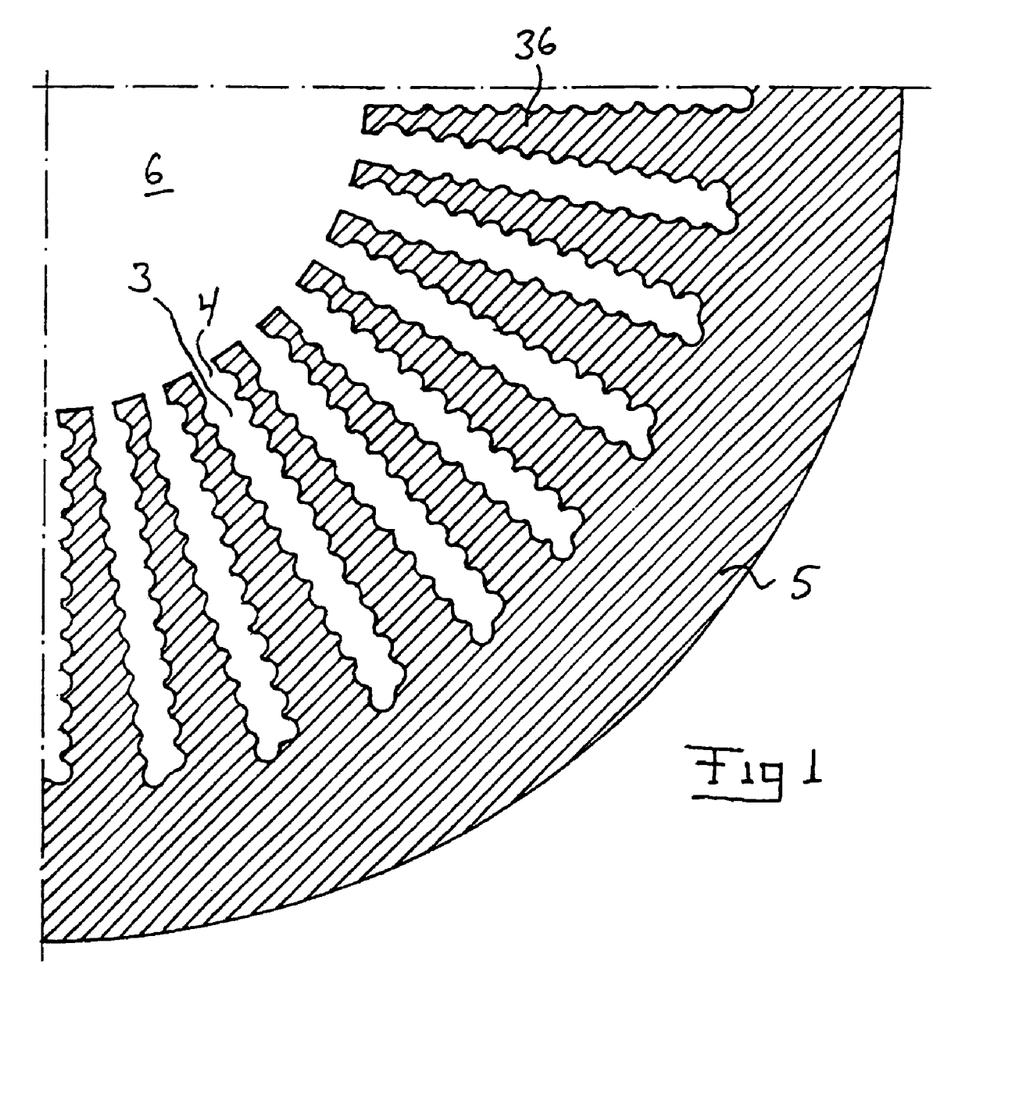
FIG. 1 a schematical cross-section through a stator core provided with "double-slotted" winding slots, FIGS. 2–5 schematical illustrations of how a cable turn is "lifted over" from a cable reel to a stator core at the installation of the stator winding in accordance with the inventional method, FIG. 6 a very schematical illustration of the installation of a three-phase stator winding with cables provided on three separate cable reels, FIG. 7 a very schematical illustration of how the stator core can be divided into ring-shaped areas, FIG. 8 a cross-section through a part of a stator core, illustrating a winding slot with winding cables placed in two parallel rows, FIGS. 9, 10 schematical illustrations of how a cable section can be placed in the correct position in a winding slot with the aid of a rod-shaped element, FIG. 11 a schematical illustration of a band-shaped protective element arranged in a winding slot, and FIG. 12 a view illustrating the construction of a cable particularly suited to be used in a stator winding installed in accordance with the invention.

The cable 1 intended to form the type of stator winding here intended, is provided wound on a cable reel 2. This cable 1 is flexible and comprises at least one electric conductor 50 with an envelope 51 (see FIG. 12) capable to confine the electric field generated around the conductor. When the stator winding is to be installed, the cable is drawn out from the cable reel and applied in winding slots 3, which are intended for receiving the stator winding and are formed in a stator core 5. FIG. 1 shows in a schematical cross-section a sector of a stator core 5 provided with so called "double-slots" i.e. each winding slot 3 is designed to receive a cable winding arranged into essentially parallel rows. It is of course also possible to design the winding slots for receiving a cable winding arranged in one row or in more than two parallel rows. These winding slots 3 are delimited by so called stator teeth 36 and extend axially through the stator core 5. Each of the winding slots 3 has a longitudinal opening 4 that opens on to the cavity 6 in the centre of the stator core, which cavity is intended for receiving a rotor. Said opening has an opening width that is larger than the diameter of the cable so as to allow the cable to be inserted in its cross-direction in the winding slots via said cavity 6.

Figures 2, 3, 4:
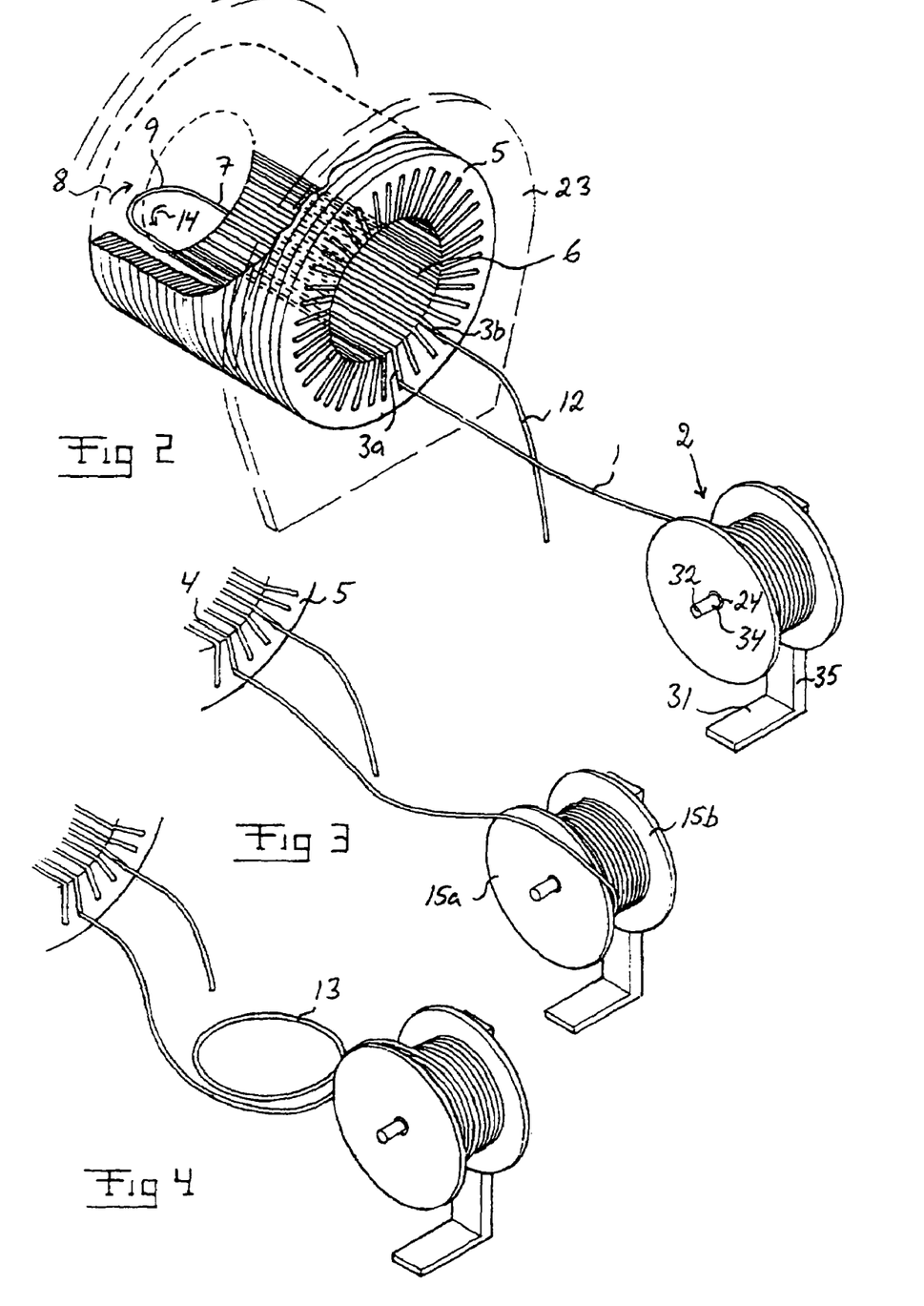

The basic principle of the inventional method for installation of the stator winding is schematically illustrated in FIGS. 2–5. A cable portion is first drawn out from the cable reel 2 and brought through the cavity 6 in the centre of the stator core so that the cable is made to extend once to-and-fro through said cavity 6, the end 12 of the cable being made to protrude from the stator core so as to make possible the connection of the stator winding to a current source. The cable is then inserted in its cross-direction into two winding slots 3a, 3b for the formation of a first winding turn 7 with a first winding direction, in the shown perspective in clockwise direction as indicated with the arrow 8. The part 9 of the cable that runs outside the stator core in a curve between the two winding slots forms a first part of one of the so called coil ends of the stator winding. In FIG. 2, it is illustrated how the first winding turn 7 is formed in the above-indicated way.

Figures 5, 6:
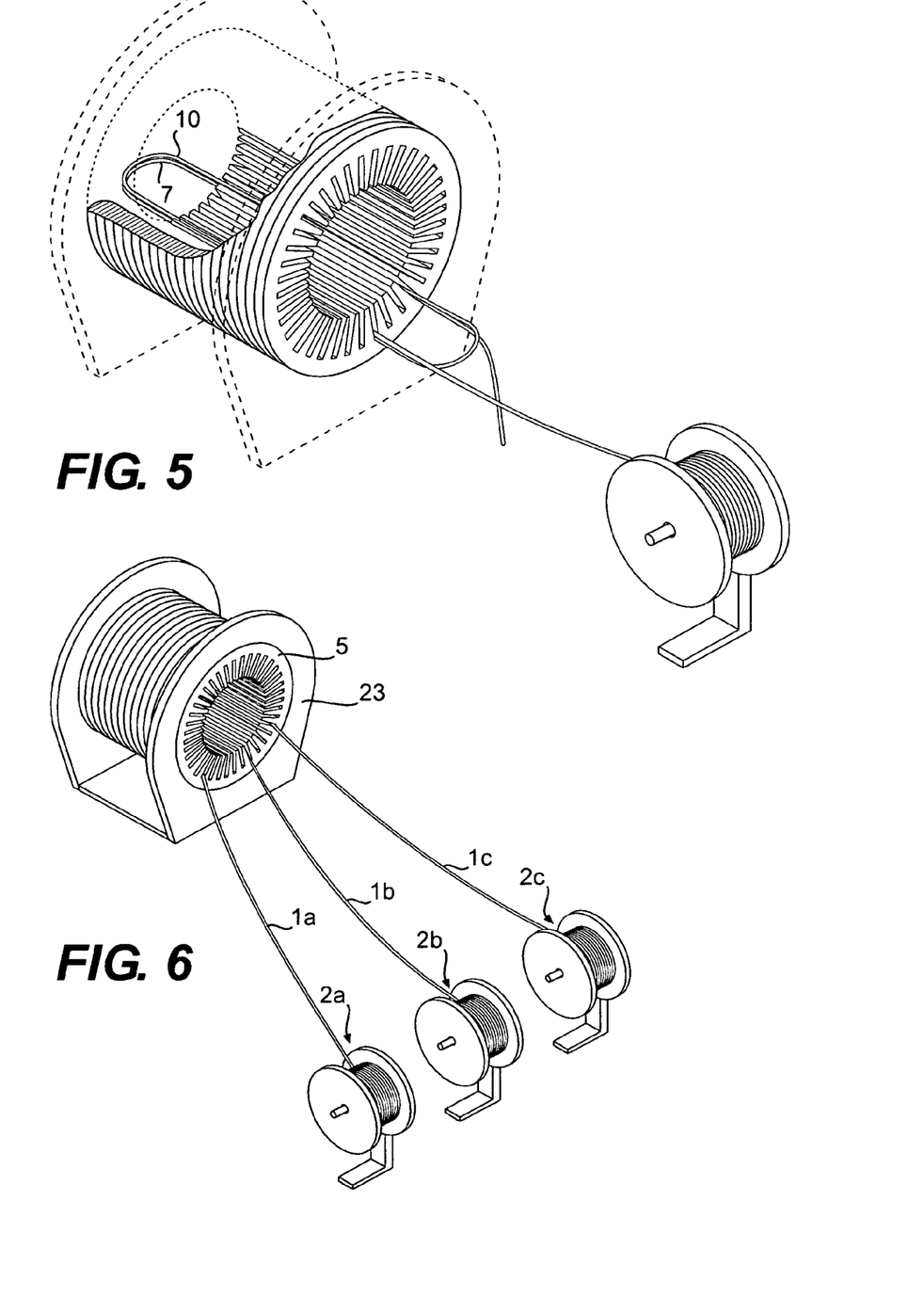

For the formation of each further winding turn 10, which is jointlessly connected to the first winding turn 7 and has the same winding direction as the first winding turn, a further cable portion is drawn out from the cable reel and brought through the cavity in the centre of the stator core so that the cable is made to extend once to-and-fro through said cavity. In order to avoid twisting of the cable resulting in kink, this cable portion is made to include a cable section 13 corresponding to a cable turn on the cable reel 2 that has been lifted off from the cable reel 2 by way of a lateral movement over one 15a of the gables of the cable reel, the left gable in the figure, as illustrated in FIG. 3. The cable section that has been lifted off will place itself in a natural loop 13 when it is placed on the ground between the cable reel 2 and the stator core 5, as illustrated in FIG. 4. This loop 13 is then drawn out to such a length that is can form a winding turn 10 and is brought into said cavity 6. The cable is then inserted into two winding slots in the above-indicated way. In FIGS. 3–5, it is illustrated how a further winding turn is applied in the same winding slots 3a, 3b as the first winding turn 7. The described method is however also used when further winding turns with the same winding direction as the first is applied in other winding slots than the first winding turn.

For the formation of each further winding turn 10, which is jointlessly connected to the first winding turn 7 and has the same winding direction as the first winding turn, a further cable portion is drawn out from the cable reel and brought through the cavity in the centre of the stator core so that the cable is made to extend once to-and-fro through said cavity. In order to avoid twisting of the cable resulting in kink, this cable portion is made to include a cable section 13 corresponding to a cable turn on the cable reel 2 that has been lifted off from the cable reel 2 by way of a lateral movement over one 15a of the gables of the cable reel, the left gable in the figure, as illustrated in FIG. 3. The cable section that has been lifted off will place itself in a natural loop 13 when it is placed on the ground between the cable reel 2 and the stator core 5, as illustrated in FIG. 4. This loop 13 is then drawn out to such a length that it can form a winding turn 10 and is brought into said cavity 6. The cable is then inserted into two winding slots in the above-indicated way. In FIGS. 3–5, it is illustrated how a further winding turn is applied in the same winding slots 3a, 3b as the first winding turn 7. The described method is however also used when further winding turns with the same winding direction as the first is applied in other winding slots than the first winding turn.

In FIGS. 2 and 5, the stator core 5 is shown in a partially cut perspective view.

The above described way of, so to say, lifting over a cable turn from the cable reel to the stator core is used in the installation of all the cable turns that are connected to each other. It is realized that the first winding turn of course can be given a winding direction opposite the one shown in FIG. 2, in which case a cable section is lifted off from the cable reel from the gable 15b constituting the right gable in the figure for the formation of each further winding turn that is jointlessly connected to the first winding turn and has the same winding direction as the first winding turn. For the formation of each further winding turn that is jointlessly connected to the first winding turn and has a winding direction opposite the winding direction of the first winding turn, a cable section is in such a case lifted off from the cable reel from the gable 15a constituting the left gable in the figure.

During the installation work, the cable reel is suspended on some kind of rack, which in its most simple form comprises a horizontally arranged, preferably circularly cylindrical shaft 34, which in one of its ends is attached to a base 35 and which has its other end 32 free. The cable reel is in this case rotatably arranged on this shaft in that the shaft extends through the hub 24 of the cable reel. It is realized that the cable reel is arranged on this rack with the gable over which the next cable turn is intended to be lifted turned away from the base, i.e. with this gable arranged closest to the free end 32 of the shaft. When the winding direction is changed, the cable reel 2 has to be arranged so that the other gable will face the free end 32 of the shaft. In order to achieve this, the cable reel can be lifted over to another rack of the corresponding kind, the gable previously facing the free end 34 now being made to be turned away from this. It is of course also possible to use only one rack 31 of the indicated type, in which case the cable reel is lifted away from the rack when the winding direction is to be changed, whereupon the rack is moved around to the other side of the cable reel and the shaft 34 is inserted from the opposite gable of the cable reel.

With the inventional method, it is possible to install a three-phase stator winding completely without any cable joints, the respective winding phase being formed of a separate, jointless cable. This is suitably carried out by alternate winding of three different cables, each provided with its own cable reel, as illustrated in FIG. 6, the first winding phase being formed of a first cable 1a provided wound on a first cable reel 2a, the second winding phase being formed of a second cable 1b provided wound on a second cable reel 2b and the third winding phase being formed of a third cable 1c provided wound on a third cable reel. 2c. By changing between the different cable reels during the installation of the stator winding, a jointless three-phase winding can be built up. One can for instance start by firstly installing all winding turns in the first stator pole for the first winding phase with cable from the first cable reel 2a, thereafter installing all winding turns in the first stator pole for the second winding phase with cable from the second cable reel 2b and thereafter installing all winding turns in the first stator pole for the third winding phase with cable from the third cable reel 2c. At the transition to the second stator pole and winding of the first phase, with opposite current direction and thereby opposite winding direction, cable is taken from the first cable reel 2a, whereupon all winding turns in the second stator pole for the second winding phase are formed with cable from the second cable reel 2b, and so on. The winding is carried on in this way with repeated changes of cable reels until the whole stator winding is installed. During the entire installation work, cable is taken from the respective cable reel in the way described above with reference to FIGS. 2–5.

In order to facilitate the work with the installation of the stator winding in a stator core having a very large diameter, the stator core 5 can with advantage be mounted in a rack 23 comprising means, not shown, for rotation of the stator core 5 around its centre axis. In this way, the stator core 5 can be turned so that the winding slots, into which cable is intended to be inserted at the moment, are located with their longitudinal openings 4 directed upwards, i.e. located at the part of the stator core that presently constitutes the lower part thereof. Hereby, it will be possible to be helped in a natural way by the gravitational forces on the cable at the insertion of the cable in the intended winding slots, at the same time as these winding slots are easy to reach by the personnel performing the installation work.

Figure 7:
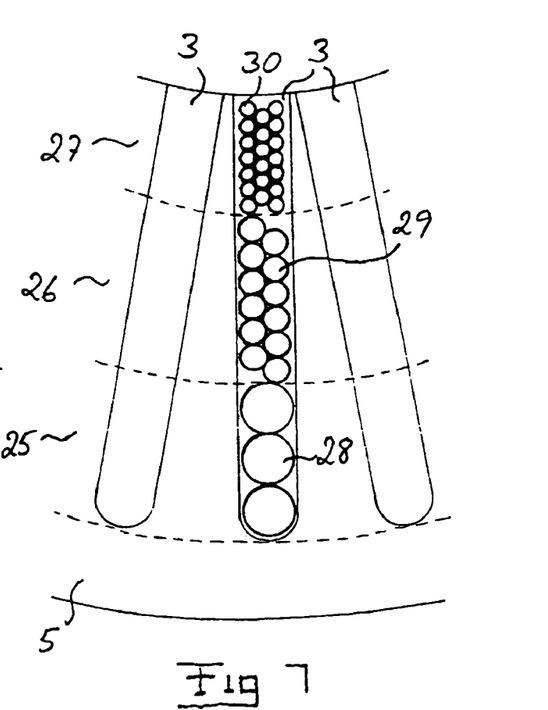

According to a preferred embodiment of the invention, the stator winding is installed, as seen in a cross-section through the stator core 5, into two or more radially successive ring-shaped areas 25–27, which areas are illustrated with broken line in FIG. 7, which figure shows a cross-section through a part of the stator core 5. The respective area has a radial extension along the winding slots 3 and covers a complete turn around the stator core 5, the different areas being successively filled with cable sections in such a way that a radially outer section 25 is filled with all the cable sections that are intended to be included in the section before an area 26 located radially inside this outer area is filled with cable sections. Each winding phase in one and the same area is suitably formed by winding turns that are jointlessly connected to each other, i.e. of a continuous cable from one and the same cable reel.

In this way, it will be easy to get a good structure on the construction of the stator winding. The transitions from one area to the next area will for instance offer suitable and natural places for any possibly required cable joints, for instance between cables of different thickness. At the installation of a stator winding consisting of cables having different thickness, see FIG. 7, the areas 25–27 can for instance be filled with cable sections of different thickness in such a way that one and the same area is made to comprise cable sections with one and the same thickness.

In FIG. 7, a division of the winding slots into three different areas is illustrated. The number of areas and their width will of course vary depending on the specific design of the stator winding, which in its turn depends inter alia on the type and the size of the stator. For the sake of simplicity, only one winding slot filled with cable is shown in FIG. 7.

The need of cable insulation is different in different winding turns and by using cables having different thickness, with thicker cables arranged in winding turns where the need of cable insulation is the largest and thinner cables arranged in winding turns where the need of cable insulation is the smallest, one and the same winding slot can be made to accommodate a larger number of cable sections as compared to the case that cable of one and the same thickness is used. In FIG. 7, a stator winding comprising cables of three different thicknesses is illustrated. The expression thickness here refers to the thickness of the insulating envelope 51 of the cable. The conductor 50 of the cable may be of a constant cross-sectional dimension in the entire stator winding, but may also be of different cross-sectional dimensions in different winding turns. In the example illustrated in FIG. 7, the thickest cable 28 is placed at the bottom of the winding slot 3 in the radially outermost area 25. The second thickest cable 29 is placed in the intermediate area 26 and the thinnest cable 30 is in its turn placed in the radially innermost area 27. Consequently, the cables are here arranged in such a way that the thickness of the cable sections placed in a winding slot is gradually reduced from the end of the respective winding slot located farthest away from the centre of the stator core, i.e. the radially outermost end, and in towards the centre of the stator core. How the differently thick cable sections are arranged in the stator winding depends on the winding pattern in question and the cable sections do of course not have to be arranged in the way illustrated in FIG. 7.

Each part of the stator winding belonging to one and the same winding phase and consisting of cable with one and the same thickness is preferably formed by winding turns that are jointlessly connected to each other, i.e. of a continuous cable from one and the same cable reel. Hereby, cable joints only have to be arranged at the transition between cables of different thickness.

Figure 8:
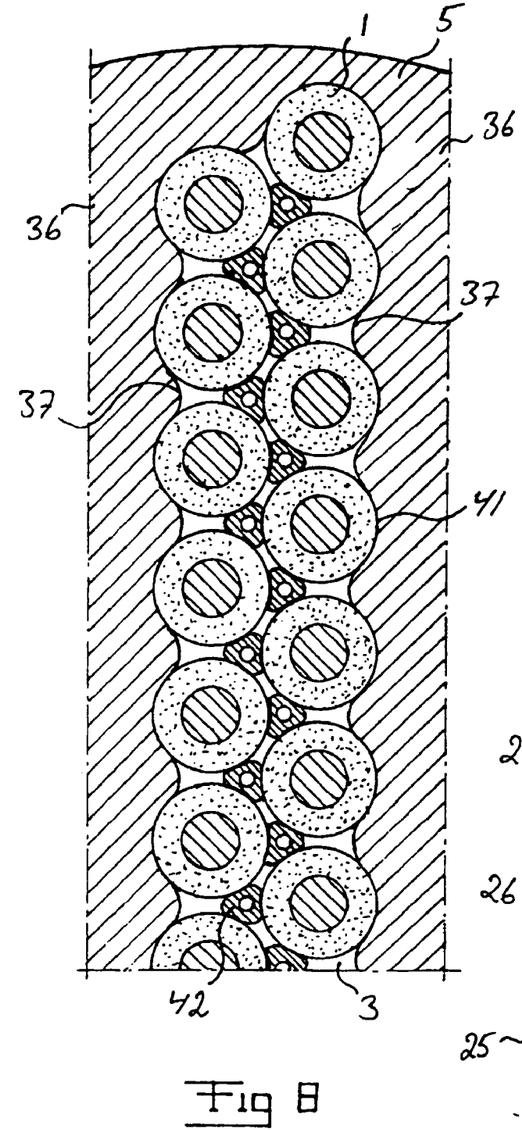

In FIG. 8, it is illustrated how the cable included in the stator winding can be arranged in a winding slot 3. In the stator core illustrated in FIG. 8, the winding slots 3 are designed as double-slots. Shoulders 37 are arranged in the opposite walls of each winding slot 3, i.e. in the two adjacent stator teeth 36 that delimits the respective winding slot. With the aid of these shoulders 37, which are rounded with a radius of curvature that is somewhat smaller than the corresponding radius of the cable so that the abutting cable is well connected to the curvature of the shoulders, it will be possible to clamp each new cable inserted into the winding slot 3 between a shoulder and the previous cable in the winding slot 3.

By arranging the shoulders 37 in such a way that a shoulder in one of the walls of the winding slot is located opposite the valley 41 formed between two shoulders in the opposite wall of the winding slot, as illustrated in FIG. 8, the installation of the cable winding in the winding slots is facilitated.

In order to press the cables safely against the wall of the winding slot, which is necessary in order to obtain a good cooling and avoid possible vibrations, a profile 42 of elastic material is in the embodiment according to FIG. 8 placed in the spaces between adjacent cables. The profile 42 can be designed as a thick-walled hose or as a homogeneous strip of silicon rubber or elastic cellular rubber. The profile 42 is so dimensioned that it is able to absorb variations in the diameter of the cable, for instance caused by settlement, thermic expansion or dimensional deviations at the manufacturing. Instead of installing profiles, as illustrated in FIG. 8, a cloth of elastic material, such as cellular rubber, might be placed between the two cable rows in the winding slot 3. The thickness of the cloth is in this case adapted so that the cloth, in the same way as the profiles 42, will press the cables in a safe manner against the wall of the winding slot in order to achieve an effective cooling and avoid vibrations, which might cause wear damages, and in order to absorb variations in the cable diameter as mentioned above.

By designing the winding slot as double-slots, a larger amount of cable can be accommodated in a winding slot of a certain depth as compared to a "single-slotted" winding slot. This entails that the winding slots can be made less deep, which results in shorter and thereby less vibrationally disposed stator teeth between the winding slots. Furthermore, a reduction of the total weight of the stator core is obtained. Furthermore, the double-slotted design entails that the winding slots will be broader, whereby the insertion of the cable into the winding slots via the cavity 6 in the centre of the stator core is facilitated.

For the installation of stator windings according to certain winding patterns, it might sometimes be necessary to firstly put a cable section included in a winding turn into a winding slot in order to later lift this cable section out of the winding slot so as to allow the insertion into the winding slot of another cable section included in a subsequently laid out winding turn, which cable section is intended to be placed deeper down into the winding slot than the cable section included in the previously laid out winding turn. In order to facilitate the installation work, it might in such a case be suitable, at the laying out of the earlier winding turn, to place a cable dummy on the place in the winding slot that is intended to be occupied later on by the cable section included in the later winding turn. This dummy is then lifted away when the first cable section is to be lifted out in order to give room for the insertion into the winding slot of the later cable section. The dummy suitably has essentially the same diameter as the cable section whose place it is intended to occupy temporarily. In order to make it easy to lift away the dummy, this should be longer than the winding slots/stator core so that it protrudes outside the ends of the stator core when it is installed in a winding slot.

Figure 9:
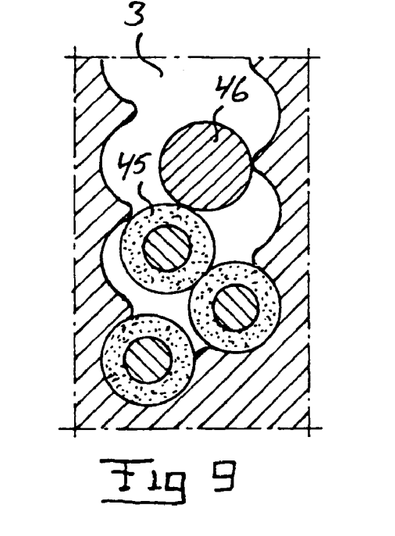
Figure 10:
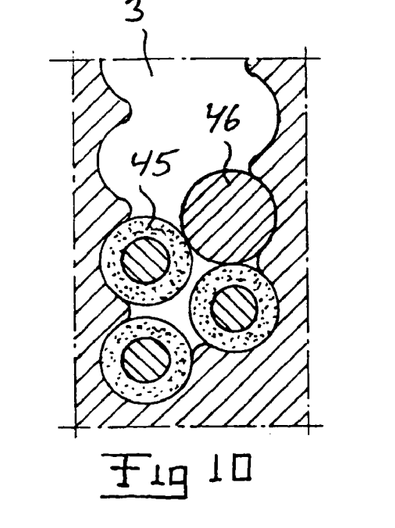

When the winding slots 3 are designed with shoulders of the above-indicated type, it might sometimes be necessary to press or hit the cable into its intended position in the winding slot. In FIGS. 9 and 10, it is illustrated how a cable section 45 is put in place in the intended winding slot 3 with the aid of a rod-shape element 46. The outer layer of the cable is sensitive to damages and it is therefore not suitable to hit directly on a cable section with a tool for the purpose of forcing the cable section 45 down into its intended place in the winding slot 3. A rod-shaped element 46 is therefore used in order to protect the cable against damages, which element is placed against the cable section 45 along the cable section after the cable section has been inserted into the winding slot, whereupon said element is activated upon by impacts with the aid of a suitable striking tool. Owing to the fact that the rod-shaped element 46 is placed between the cable section 45 and the striking tool, the impacts from the striking tool will be distributed over a relatively long distance along the cable section. The rod-shaped element 46 suitably has essentially the same external diameter as the next cable section that is intended to be placed later on immediately outside the cable section 45 installed in the winding slot with the aid of the element 46. During the installation of the cable section 45, said element 46 is by impact influence made to occupy the place in the winding slot intended for the next cable section, whereby the element is made to press the cable section 45 down into its intended place in the winding slot in the whole length of the cable section, see FIG. 10. After the cable section 45 has been made to occupy its intended position in the winding slot, the element is lifted away and out of the winding slot so as to allow the insertion of the next cable section. The rod-shaped element 46 is suitably longer than the winding slots/stator core so that the element at the installation of a cable section can be arranged in a winding slot with its ends protruding out of the winding slot at the ends of the stator core. Hereby, the element 46 can easily be lifted out of the winding slot after the installation of a cable section. In order not to risk any damages to the cable, the rod-shaped element 46 must have a smooth surface. The element 46 is suitably made of a plastic material.

Figure 11:
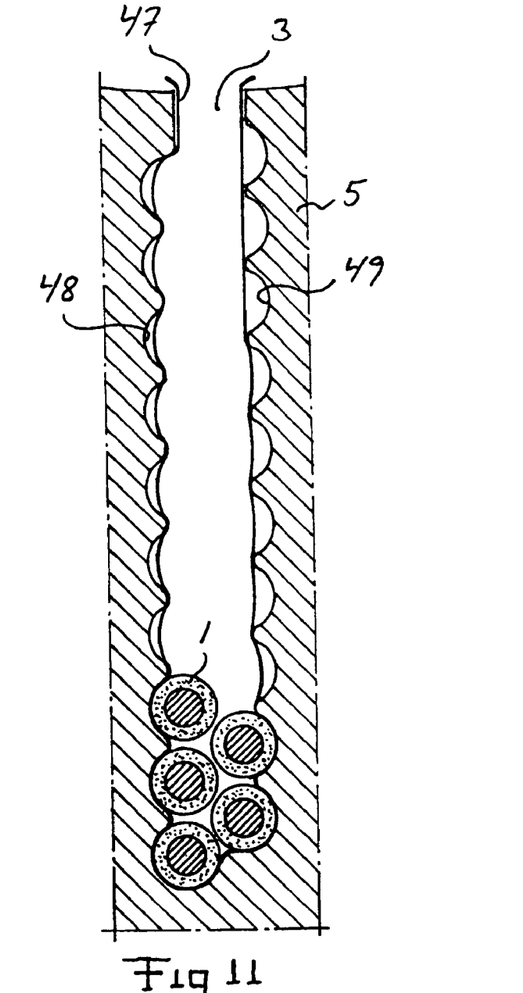

In FIG. 11, it is illustrated how a band-shaped element 47 is placed between the cable 1 and the walls 48, 49 of a winding slot 3 at the areas of the axial ends of the winding slot where the cable exits the winding slot, i.e. the areas at the ends of the stator core where the cable exits or enters the stator core. This band-shaped element 47 prevents wear between the cable 1 and the stator core 5 in these areas and consequently constitutes a protection for the outer layer of the cable. The element 47 suitably consists of the same material as the outer layer of the cable and suitably has a width of some centimetres and a thickness of approximately 0.3 millimetres.

Figure 12:
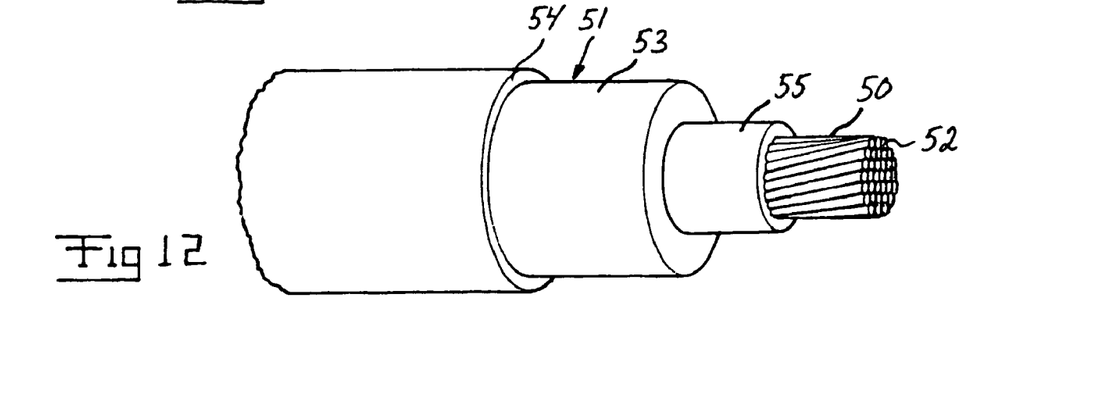

Finally, the construction of a cable of the type particularly well suited to be used for the formation of a stator winding in a rotating electric machine for high voltages is illustrated in FIG. 12. This cable has an inner electric conductor 50 with a large number of strands 52, which might be electrically insulated from each other by a thin insulating layer of for instance an insulating lacquer or an aluminium oxide layer, if the conductors are made of aluminium. They might however also be uninsulated in relation to each other. The cable also has an envelope 51, which encloses the electric conductor and is capable to confine the electric field generated around the conductor. This cable has an inner flexible electric conductor 50 and an envelope 51, which forms an insulating system, which comprises an insulation 53 formed by a solid insulating material, preferably a material on polymeric basis, and an outer layer 54 outside the insulation, which outer layer has an electric conductivity that is higher than that of the insulation so that the outer layer by connection to earth or otherwise a comparatively low potential will be able to on one hand operate potential equalizing and on the other hand to essentially confine the electric field created as a consequence of said electric conductor 50 interiorly of the outer layer 54. Furthermore, the outer layer should have a resistivity that is sufficient for minimizing the electric losses in the outer layer. The insulating system further comprises an inner layer 55, which has said at least one electric conductor 50 arranged interiorly thereof and has an electrical conductivity that is lower than that of the electric conductor but sufficient for making the inner layer operate potential equalizing and thereby equalizing as concerns the electric field outside the inner layer. Consequently such a cable is of a type corresponding to cables having a solid extruded insulation and today used within power distribution, for instance so called PEX-cables or cables with EPR-insulation. The used term "solid insulating material" means that the winding is to lack any liquid or gaseous insulation, for instance in the form of oil. The insulation is instead intended to be formed by a polymeric material. Also the inner and outer layers are formed by a polymeric material, although a semiconducting one. The insulation 53 may consist of a solid thermoplastic material, such as low-density polyethylene (LDPE), high-density polyethylene (HDPE), polypropylene (PP), polybuthylene (PB), poly-methyl-epentene (PMP), cross-linked polyethylene (XLPE) or rubber such as ethylene-propylene rubber (EPR) or silicon rubber. As concerns the resistivity of the inner layer and the outer layer, this should be within the range $10^{-6}$ $\Omega$cm–100 k$\Omega$cm, suitably $10^{-3}$–1000 $\Omega$cm, preferably 1–500 $\Omega$cm. For the inner and outer layer, a resistance which per length meter of the conductor/insulating system is within the range 50 $\mu\Omega$–5 M$\Omega$ is advantageous.

The electric stress on the insulating system is reduced as a consequence of the fact that the inner and outer layers of semiconducting material around the insulation will tend to form essentially equipotential surfaces, and the electric field in the insulation will in this way be distributed comparatively homogeneously over the thickness of the insulation.

The adherence between the insulating material and the inner and outer semiconducting layers has to be uniform over essentially the entire interface therebetween, so that no hollow spaces, pores or the like can emerge. This is of course particularly important in high-voltage applications, and a cable of this type has preferably an insulating system designed for high voltage, suitably over 10 kV, especially over 36 kV and preferably over 72 kV. Electrical and thermal stresses occurring at such high voltages pose very high demands on the insulating material. It is known that so-called partial discharges, PD, in general constitutes a severe problem to the insulating material in high-voltage installations. If hollow spaces, pores or the like would be formed in an insulating layer, inner corona discharges could occur at high electrical voltages, whereby the insulating material is gradually degraded and the result could be electrical breakdown through the insulation. This could result in a severe breakdown of the stator.

In order to avoid the occurrence of such hollow spaces or pores, it is advantageous that the inner and outer layers and the solid insulation have essentially the same thermal properties, it being particularly important that they have essentially the same coefficients of thermal expansion, so that a perfect adherence between the different layers can be maintained during temperature changes thereof and so that the cable expands and contracts uniformly as a monolithic body during temperature changes without any destruction or degradation of the interfaces. For a PEX-cable as an example, the insulating layer is of cross-linked low-density polyethene and the semiconducting layers of polyethene with soot and metal particles admixed. Volume changes as a consequence of temperature changes are absorbed entirely as changes of the radius of the cable, and due to the comparatively small difference of the coefficients of thermal expansion of the layers with respect to the elasticity of these materials, the radial expansion of the cable is able to take place without the layers coming loose from each other.

The cable also has to have such a flexibility that it is flexible down to a radius of curvature being below 25 times the diameter of the cable so that bending may take place while ensuring a good adherence between the respective layer and the solid insulation. The cable is suitably flexible to a radius of curvature below 15× the diameter of the cable, and preferably to a radius of curvature below 10× the diameter of the cable. In order not to induce any unnecessary shearing stresses in the interfaces between the different layers in the insulating system, the coefficient of elasticity of the different layers should be essentially equal, so that a reduction of the shearing stresses, which may be created between the different layers when the cable is subjected to powerful bending resulting in tensile stresses on the outside of the bend and compressive stresses on the inside of the bend, may take place.

A rotating electric machine comprising a stator with a stator winding installed in accordance with the inventional method is suited as a motor with an effective power between 1 MW and 100 MW and a rated voltage between 10 and 150 kV. It is however also suited as a generator. Such a machine is adapted to be directly connected without any intermediate transformer to a power network designed for high voltage, suitably 10 kV and above and preferably 36 kV and above.

The invention is of course not in any way restricted to the preferred embodiments described above, but many possibilities to modifications thereof should on the contrary be evident to a person skilled in the art without deviating from the basic idea of the invention such as defined in the appended claims.

The invention claimed is:

1. A method for installing a stator winding, the method comprising:
   providing a stator core having winding slots, which extend axially through the stator core and which are intended for receiving the stator winding,
   providing on a cable reel at least one cable for very high voltages, which is flexible and comprises at least one electric conductor with an envelope capable of confining the electric field generated around the conductor,
   drawing a cable portion out from the cable reel,
   bringing the cable portion through the cavity in the center of the stator core, so that the cable is made to extend once through said cavity,
   inserting the cable into two winding slots via a longitudinal opening of the respective winding slot, which opening opens on to said cavity, for the formation of a first winding turn with a first winding direction,
   forming each further winding turn that is jointlessly connected to the first winding turn and has the same winding direction as the first winding by drawing out a first further cable portion from the cable reel,
   bringing the first further cable portion through said cavity in the center of the stator core, thereby making the cable extend once through said cavity,
   making the first further cable portion include a cable section in the shape of a loop corresponding to a cable turn on the cable reel that has been lifted off from the cable reel by way of a lateral movement over one of the gables of the cable reel, the loop having a first and a second section,
   inserting the cable in its cross-direction into two winding slots via a longitudinal opening of the respective winding slot, which opening opens on to said cavity, each of said first and second sections occupying a different one of said two winding slots,
   drawing out a second further cable portion from the cable reel to form each further winding turn that is jointlessly connected to the first winding turn and has a second winding direction opposite the winding direction of the first winding turn,
   bringing the second further cable portion through said cavity in the center of the stator core, so that the cable is made to extend once through said cavity,
   making the second further cable portion include a cable section in the shape of a loop corresponding to a cable turn on the cable reel that has been lifted off from the cable reel with a lateral movement over the other gable of the cable reel, the loop having a first and a second section and
   inserting the cable in its cross-direction into two winding slots via a longitudinal opening of the respective winding slot, which opening opens on to said cavity, each of said first and second sections occupying a different one of said two winding slots.

2. The method according to claim 1, wherein the stator winding comprises three winding phases, wherein each winding phase is formed jointlessly by a cable provided wound on a cable reel.

3. The method according to claim 2, wherein a first winding phase is formed of a cable that is provided wound on a first cable reel, a second winding phase is formed of a cable that is provided wound on a second cable reel, and a third winding phase is formed of a cable that is provided wound on a third cable reel.

4. The method according to claim 3, wherein each winding phase comprises cable having one thickness and is formed by winding turns that are jointlessly connected to each other.

5. The method according to claim 1, wherein the stator winding is formed of cables having different thickness.

6. The method according to claim 1, wherein several cable sections are arranged in a row in the respective winding slot radially outside each other.

7. The method according to claim 6, wherein cable sections are arranged in at least two essentially parallel rows in the respective winding slot.

8. The method according to claim 1, wherein the stator winding, as seen in a cross-section through the stator core, is installed in two or more radially successive ring-shaped areas, where the respective area has a radial extension along the winding slots and covers a complete turn around the stator core, the different areas being successively filled with cable sections in such a way that a radially outer area is filled with all the cable sections that are intended to be included in this area before an area located radially inside the outer area is filled with cable sections.

9. The method according to claim 8, wherein each winding phase in one and the same area is formed by winding turns that are jointlessly connected to each other.

10. The method according to claim 8, wherein the different areas are filled with cable sections of different thickness in such a way that one and the same area is made to include cable sections having one and the same thickness.

11. The method according to claim 1, wherein a band-shaped element is placed between the cable and the walls of the respective winding slot at the areas of the axial ends of the winding slot where the cable exits the winding slot, so as to protect the cable.

12. The method according to claim 11, wherein the band-shaped element comprises a same material as the outer layer of the cable.

13. The method according to claim 1, wherein a cable section is put in place in the intended winding slot with the aid of a rod-shaped element having essentially the same external diameter as the next cable section that is intended subsequently to be placed immediately outside said cable section, which rod-shaped element is placed against the cable section along the cable section after the cable section has been inserted into the winding slot, whereupon said element is acted upon by impacts so that the element is made to occupy the place in the winding slot intended for the next cable section, whereby the element is made to press the cable section down into its intended place in the winding slot.

14. The method according to claim 1, wherein an elongated element of elastic material is placed in the spaces in the winding slots between adjacent cable sections.

15. The method according to claim 14, wherein the elongated element of elastic material comprises the form of a hose.

16. The method according to claim 1, wherein each slot in the stator core comprises two walls including a plurality of alternatingly arranged apertures.

\* \* \* \* \*